(12) United States Patent
Bell

(10) Patent No.: US 8,333,033 B2
(45) Date of Patent: Dec. 18, 2012

(54) DEVICE AND METHOD FOR GROWING VEGETATION

(76) Inventor: Gary Michael Bell, Crystal, MN (US)

( * ) Notice: Subject to any disclaimer, the term of this patent is extended or adjusted under 35 U.S.C. 154(b) by 197 days.

(21) Appl. No.: 13/010,282

(22) Filed: Jan. 20, 2011

(65) Prior Publication Data

US 2011/0173879 A1    Jul. 21, 2011

Related U.S. Application Data

(60) Provisional application No. 61/296,794, filed on Jan. 20, 2010.

(51) Int. Cl.
*A01G 9/02* (2006.01)
(52) U.S. Cl. ........................................................ 47/48.5
(58) Field of Classification Search .............. 47/1.01 R, 47/1.01 F, 1.01 T, 56, 59 S, 65.5, 65.7, 65.8, 47/65.9, 66.1, 66.6, 66.7, 73, 74, 84, 85
See application file for complete search history.

(56) References Cited

U.S. PATENT DOCUMENTS

| | | | |
|---|---|---|---|
| 3,241,264 A * | 3/1966 | Porter et al. ........................ 47/81 |
| 3,316,676 A * | 5/1967 | Legal, Jr. et al. ............ 47/58.1 R |
| 3,733,745 A * | 5/1973 | Ingerstedt et al. ................. 47/77 |
| 4,000,580 A * | 1/1977 | Biehl ................................. 47/14 |
| 4,079,547 A | 3/1978 | Walker |
| 4,190,981 A | 3/1980 | Muldner |
| 4,209,945 A * | 7/1980 | Dent et al. ......................... 47/84 |
| 4,392,328 A | 7/1983 | Walker |
| 4,424,645 A | 1/1984 | Rannali |
| 4,653,225 A * | 3/1987 | Spector ............................... 47/84 |
| 4,790,105 A * | 12/1988 | Wareing et al. .................... 47/84 |
| 5,241,783 A * | 9/1993 | Krueger ......................... 47/65.8 |
| 5,421,123 A | 6/1995 | Sakate et al. |
| 6,016,628 A | 1/2000 | Schlosser |
| 6,618,987 B1 | 9/2003 | Bowker |
| 6,637,355 B2 | 10/2003 | Springs |
| 6,739,486 B2 | 5/2004 | Winkler |
| 7,156,269 B1 | 1/2007 | Meyer et al. |
| 7,216,785 B1 | 5/2007 | Meyer et al. |
| 7,490,805 B2 | 2/2009 | Krall |
| 2002/0033402 A1 | 3/2002 | Winkler |
| 2002/0037779 A1 | 3/2002 | Meyer et al. |
| 2004/0012973 A1 | 1/2004 | Baker et al. |
| 2004/0139650 A1* | 7/2004 | Haq ................................ 47/48.5 |
| 2005/0097816 A1 | 5/2005 | Elder et al. |
| 2011/0247269 A1* | 10/2011 | Cool et al. ..................... 47/66.7 |

FOREIGN PATENT DOCUMENTS

EP    0 572 728    8/1993

* cited by examiner

*Primary Examiner* — Rob Swiatek
*Assistant Examiner* — Ebony Evans
(74) *Attorney, Agent, or Firm* — Winthrop & Weinstine, P.A.

(57) ABSTRACT

A device and method for growing vegetation. The device and method can be used for repairing a divot in a grass lawn. The device includes a packet having a water-soluble film surface that contains a mixture of soil and seeds. An example device includes a water-containing device in the packet. When the packet is placed on the ground, such as the divot, and subjected to water, the film dissolves so that the mixture comes into contact with the ground and the seeds can begin to germinate and grow.

10 Claims, 4 Drawing Sheets

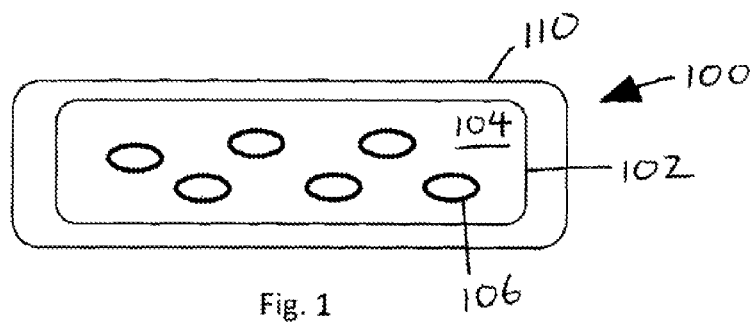
Fig. 1
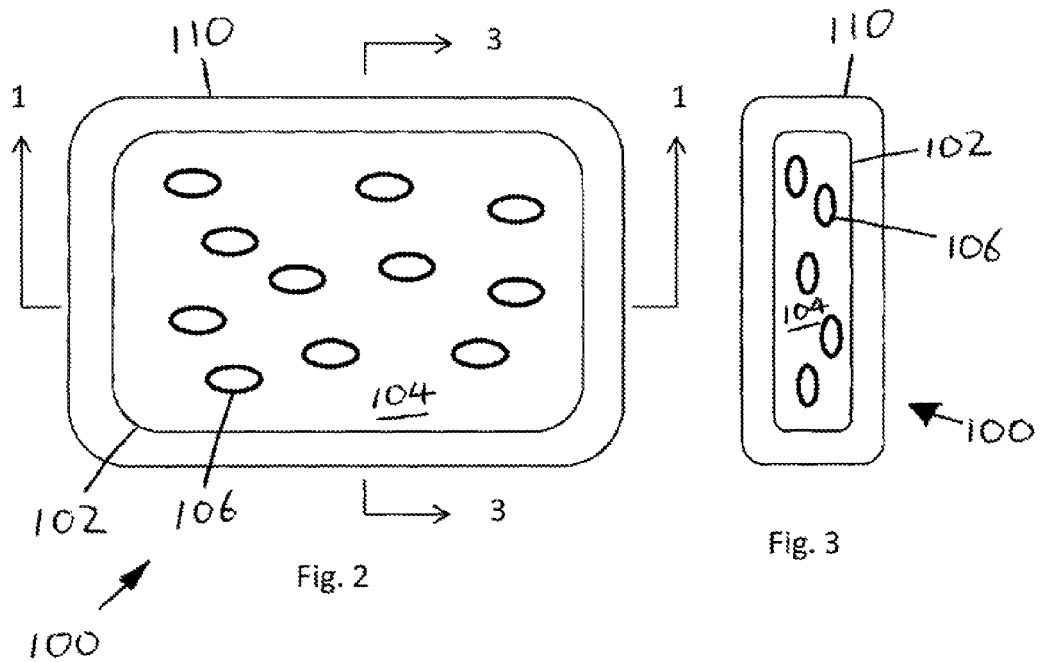
Fig. 2
Fig. 3

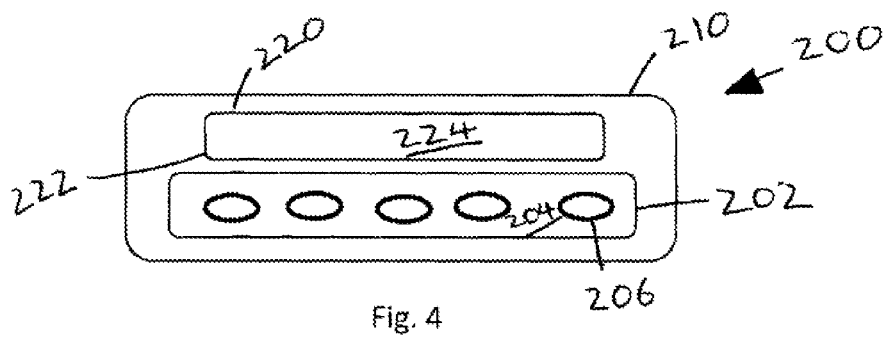
Fig. 4
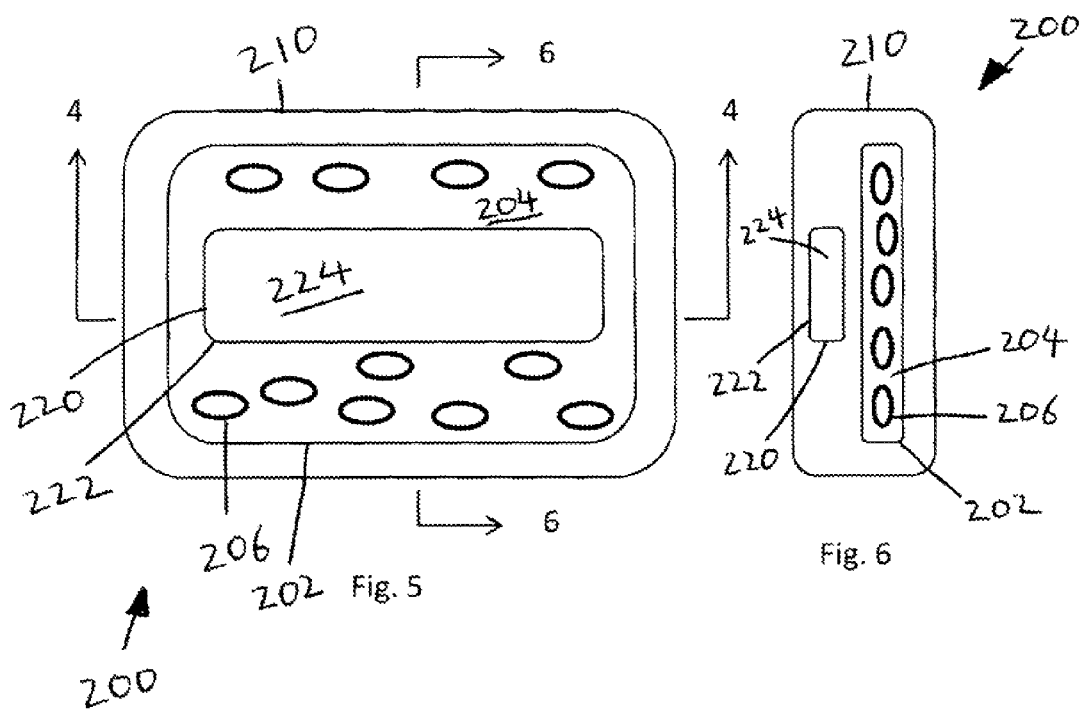
Fig. 5
Fig. 6

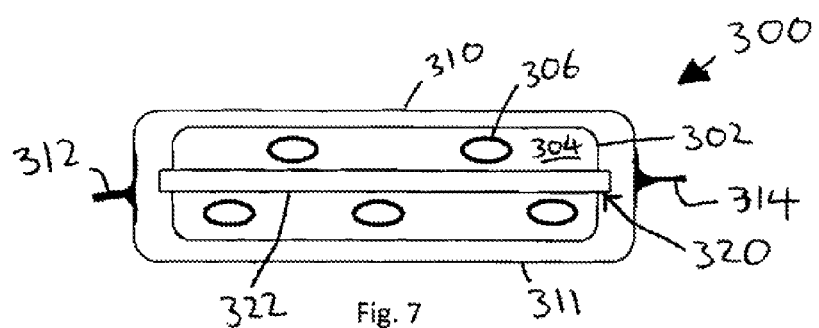
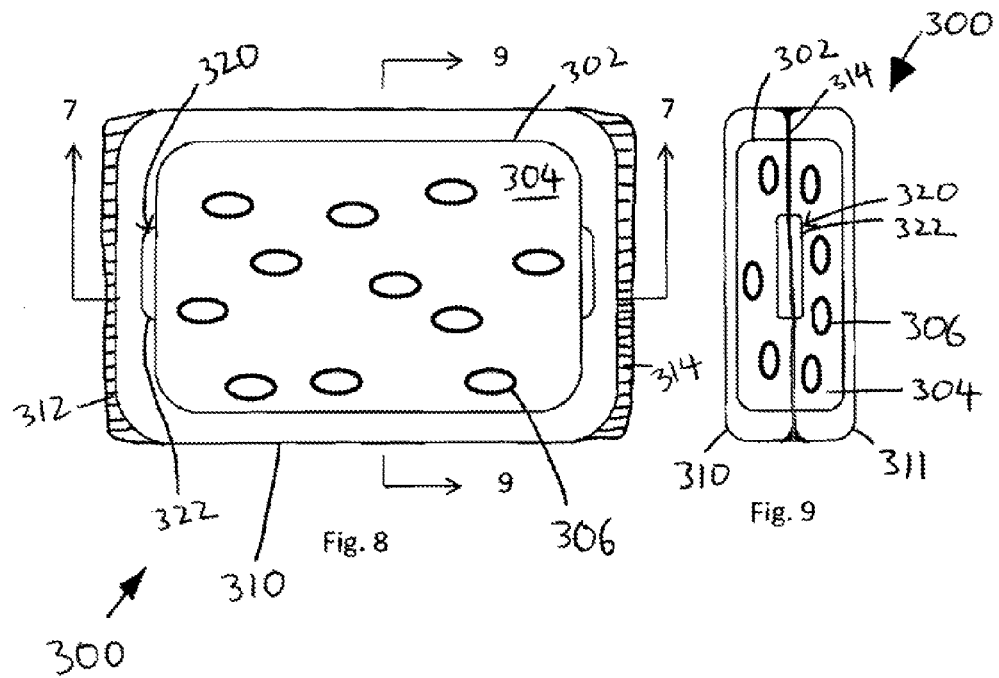

US 8,333,033 B2

DEVICE AND METHOD FOR GROWING VEGETATION

CROSS-REFERENCE TO RELATED APPLICATIONS

This application claims benefit of U.S. Provisional Application No. 61/296,794 filed on Jan. 20, 2010, which is incorporated herein by reference.

FIELD

This description relates generally to a device and method for growing vegetation.

BACKGROUND

Conventional method of growing vegetation involved placing a seed into soil by hand. Conventional method for growing vegetation on a damaged portion of a field, for example, growing grass on a divot made by golfers on a golf course, includes pouring by hand a pre-mixed mixture of soil and grass seeds into the divot. The conventional mixture of soil and grass seeds is generally pre-mixed on-sight at the golf-course. It is estimated that the golf course can use up several tons of the mixture every day, spending about 16 hours every day to make the mixture. A box containing the mixture can be carried on a golf cart. The box containing the mixture may be carried on a golf bag. In the conventional method, filling a divot requires scooping up the mixture from the box and then spreading the mixture into the divot.

BRIEF SUMMARY

An embodiment device is a packet for growing vegetation, comprising a surface film defining the packet, wherein the surface film including a water-soluble film. The water-soluble film is dissolvable upon contact with water, the surface film surrounding a mixture. The mixture includes soil and seeds. An embodiment of the packet includes the water-soluble film being polyvinyl alcohol (PVOH) film. An embodiment of the packet includes grass seeds in the mixture for growing grass. An embodiment of the packet further includes a water-containing device containing water, wherein the water-containing device is contained in the packet, and the water-containing device includes a non-water-soluble film surface. The water may be liquid water. The water may be absorbed in a hydro gel. An embodiment of the packet further includes a green colorant dye contained in the packet. An embodiment of the packet includes the surface of the packet wherein at least a portion of the water-soluble film is green.

An embodiment of the device is a packet for growing vegetation, comprising a pair of water-soluble films sandwiching a mixture, wherein the mixture includes soil, and seeds. The pair of water-soluble films being heat sealed to enclose the mixture.

The mixture may include one or more of sand, mulch, and/or a water jelly crystal.

An embodied method for growing vegetation, comprises providing a packet including water-soluble film containing a mixture, wherein the mixture includes soil and seeds, the packet further including a sealed bag of non-water-soluble film containing water, placing the packet on a ground, breaking the non-water-soluble sealed bag to allow the water therein to contact the water-soluble film to dissolve at least some of the water-soluble film, and allowing the water to moisten the mixture to begin germination of the seeds. The method may include stepping on the packet by a user for breaking the non-water-soluble sealed bag.

BRIEF DESCRIPTION OF THE DRAWINGS

FIG. 1 is a drawing showing a top view of an exemplary packet.

FIG. 2 is a drawing showing a front view of the packet shown in FIG. 1.

FIG. 3 is a drawing showing a side view of the packet shown in FIG. 1.

FIG. 4 is a drawing showing a top view of an exemplary packet.

FIG. 5 is a drawing showing a front view of the packet shown in FIG. 4.

FIG. 6 is a drawing showing a side view of the packet shown in FIG. 4.

FIG. 7 is a drawing showing a top view of an exemplary packet.

FIG. 8 is a drawing showing a front view of the packet shown in FIG. 7.

FIG. 9 is a drawing showing a side view of the packet shown in FIG. 7.

DETAILED DESCRIPTION

Figure 10:
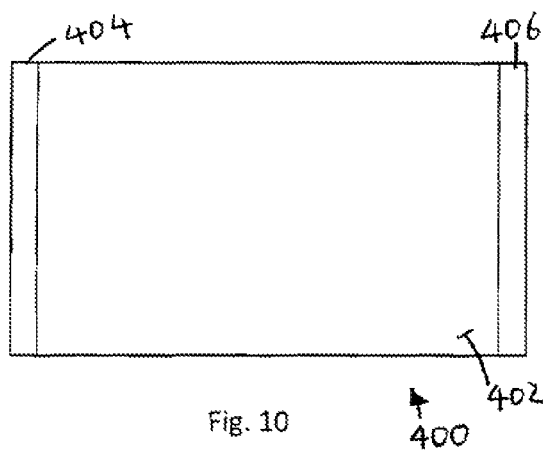
FIG. 10 is a drawing showing an exemplary packet.

The term "vegetation" is used herein to include grass, plants, flowers, vegetation, trees, and/or other non-animal living things.

A device and method for growing vegetation is described herein. The device may be in a form of a packet, containing a mixture of materials. An embodiment includes the packet having a water-soluble film. The packet includes the mixture of materials that can be used for growing vegetation and/or repairing damaged grass lawn. The film may be a water-soluble polyvinyl alcohol (PVOH) film.

An embodiment of the mixture of materials includes only two components, seeds and soil. An embodiment of the mixture includes seeds, soil, and one or more of other components. Other components include sand, mulch, water jelly crystals (hydro-gel), and one or more color dyes. Peat moss is a specific example of the mulch that can be used in the mixture. Green color dye is a specific example of a color of the color dye that can be used in the mixture. Brown color dye is a specific example of a color of the color dye that can be used in the mixture. A combination of green and brown color dyes may be included in the mixture. Other colors, such as red, orange, yellow, and other colors and combinations thereof may be used in the mixture. An embodiment of the mixture includes seeds, soil, and sand. An embodiment of the mixture includes seeds, soil, and mulch. An embodiment of the mixture includes seeds, soil, and water jelly crystals. An embodiment of the mixture includes seeds, soil, and one or more color dyes. An embodiment of the mixture includes seeds, soil, sand, and mulch. An embodiment of the mixture includes seeds, soil, sand, and water jelly crystals. An embodiment of the mixture includes seeds, soil, sand, and one or more color dyes. An embodiment of the mixture includes seeds, soil, mulch, and water jelly crystals. An embodiment of the mixture includes seeds, soil, mulch, and one or more color dyes. An embodiment of the mixture includes seeds, soil, water jelly crystals, and one or more color dyes. An embodiment of the mixture includes seeds, soil, mulch, and water jelly crystals. An embodiment of the mixture includes seeds, soil, mulch, water jelly crystals, and one or more color dyes. An embodiment of the mixture includes seeds, soil, peat moss, and water jelly crystals. An embodiment of the mixture includes seeds, soil, sand, peat moss, and water jelly crystals. An embodiment of the mixture of materials includes two to six components. An embodiment of the mixture includes more than six components.

The seeds can be grass seeds. The seeds can be plant seeds. The seeds can be a combination of grass seeds and other plant seeds.

In an embodiment, the water jelly crystals are dry if mixed with the seeds in the mixture, prior to the use of the device. In an embodiment, the mixture is dry prior to the use of the device.

In an embodiment of the packet, a water-containing device is included inside the packet. The water-containing device may have a water-proof barrier to keep the water separated from the mixture. The water-containing device may be a container, such as a bag or a sachet. The water-containing device may be a polymer that contains the water. The water-containing device may be a bag containing one or more wet water jelly crystals. Wet water jelly crystal is used herein to mean water jelly crystals that have absorbed water. The water-containing device may be one or more wet water jelly crystals surrounded by a non-water-soluble film that can be operated to be opened. The water-containing device is configured to hold the water separated from the mixture. In an embodiment, the water-containing device is a sachet containing liquid water therein. By breaking open the sachet, by for example, stepping on the packet, the water is mixed with the mixture and also dissolves the water-soluble film of the packet. Once the water-soluble film starts to dissolve, the mixture inside the packet can contact the ground and begin the germination process of growing the vegetation from the seeds in the mixture. The water-soluble PVOH film dissolves rapidly when it comes into contact with water.

The packet provides a predetermined amount of mixture and components in the mixture needed to insure faster germination. The packet's predetermined amount of mixture and components in the mixture can provide for even coverage of the ground. The packet can provide a cleaner and more environmental friendly method for growing grass and/or repairing damaged areas of a lawn. The packet can be used for home gardening. The seeds can be flower seeds, or other types of vegetation seeds for growing plants, vegetables, and/or a mixture of different types of vegetation.

FIGS. 1-3 show a packet 100 according to an embodiment. The packet 100 contains a mixture 102 including soil 104 and seeds 106. The mixture 102 may also include the components for the mixture of materials discussed above. The packet 100 being a sealed bag, wherein at least a portion of the sealed bag includes a water-soluble film 110. The entire packet 100 may be made of a water-soluble film 110. An example of the water-soluble film 110 is PVOH film. When the packet 100 containing the mixture 102 is placed on, for example, a damaged portion of a grass lawn, the water-soluble film 110 will dissolve due to water vapor in the air and/or water sprayed onto the film 110. Then, as the film 110 dissolves, the seeds 106 will be able to germinate and grow into grass to fill in and repair the scrape or divot in the grass lawn. The packet 100 can be stored in a dispenser and dispensed to a user.

A user can transport and/or store one or more of the packets 100 in a dispenser. The user can then place the packet 100 in the scrape or divot in the grass lawn, and allow water to contact the packet 100 for dissolving the water-soluble film 110. Water can be provided from the moisture in the air, or from rain, fog, or via a sprinkler system or other mechanical means. Water will speed germination of the seeds 106 so that new grass from the seeds 106 will grow to fill in and repair the lawn.

FIGS. 4-6 show a packet 200 according to an embodiment. The packet 200 contains a mixture 202. The mixture 202 includes soil 204 and seeds 206. The mixture 202 may also include the components for the mixture of materials discussed above. The packet 200 being a sealed bag, wherein at least a portion of the sealed bag includes a water-soluble film 210. The entire packet 200 may be made of a water-soluble film 210. An example of the water-soluble film is a PVOH film. The packet 200 includes a water-containing device 220. In an embodiment, the water-containing device 220 is a sealed bag made of non-water-soluble film 222 containing liquid water 224 inside the device 220. The water-containing device 220 is contained within the packet 200. The non-water-soluble film 222 prevents the liquid water 224 from coming into contact with the mixture 202 and/or the water-soluble film 210 of the packet 200, until the user desires such contact. In an embodiment, the water-containing device 220 includes a sealed bag of non-water-soluble film 222 containing one or more wet water jelly crystals.

When the user desires to use the packet 200, the packet 200 is placed at a desired area. The user causes the liquid water 224 to break out of the water-containing device 220 and make contact with the water-soluble film 210. The user can cause this by, for example, stepping on the packet 200 so that the water-containing device 220 having the non-water-soluble film 222 breaks to allow the water 224 contained in the device 220 to spill out and contact the water-soluble film 210 of the packet 200. Alternatively, the user can fold and/or bend the packet 200, thus breaking at least a portion of the water-containing device 220 to allow the water 224 to contact the water-soluble film 210 of the packet 200. The contact of water 224 to the water-soluble film 210 dissolves the water-soluble film 210. The water 224 can also moisten the mixture 202 to begin germination of the seeds 206 in the mixture 202.

FIGS. 7-9 show a packet 300 according to an embodiment. The packet 300 contains a mixture 302. The mixture 302 includes soil 304, seeds 306, and any of the other components discussed above. The packet 300 is made from a pair of water-soluble films 310, 311 sandwiching the mixture 302. The films 310, 311 are heat sealed along at the edge or edges of the packet 300. A water-containing device 320 is provided at or near the core of the mixture 302. The packet 300 is vacuumed prior to heat sealing the edge 312 or edges 312, 314 of the packet 300 to help maintain the integrity of the packet 300. The vacuumed and heat sealing provides firmness to the packet 300. The water-containing device 320 is contained within the packet 300. The non-water-soluble film 322 prevents the water from coming into contact with the mixture 302 and/or the water-soluble films 310, 311 of the packet 300, until the user desires such contact. In an embodiment, the water-containing device 320 includes a sealed bag of non-water-soluble film 322 containing one or more wet water jelly crystals.

It is contemplated that the packet 100, 200, 300 is sized to be portable by the user. An embodied packet 100, 200, 300 is sized to be usable by the user with one hand. In an embodiment, the packet 100, 200, 300 is substantially rectangular from the front side.

FIG. 10 shows a front view of a rectangular packet 400 according to an embodiment. The packet 400 includes and is defined by a water-soluble film 402 and two heat sealed edges 404, 406. The packet 400 includes a mixture of materials, including soil, seeds, and may also include other components discussed above. The packet 400 may also include a water-containing device, like those shown in FIGS. 4-9. The packet 400 is vacuumed prior to heat sealing one of the edges 404, 406 of the packet 400.

Figure 11:
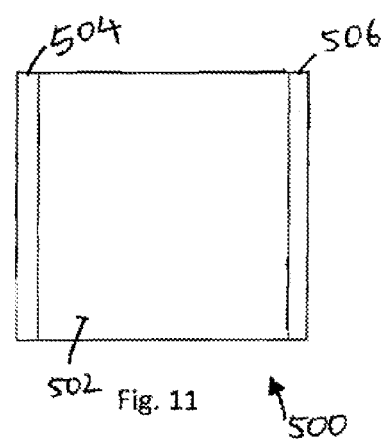
FIG. 11 is a drawing showing an exemplary packet.

FIG. 11 shows a front view of a square packet 500 according to an embodiment. The packet 500 includes and is defined by a water-soluble film 502 and two heat sealed edges 504, 506. The packet 500 includes a mixture of materials, including soil, seeds, and may also include other components discussed above. The packet 500 may also include a water-containing device, like those shown in FIGS. 4-9. The packet 500 is vacuumed prior to heat sealing one of the edges 504, 506 of the packet 500.

Figure 12:
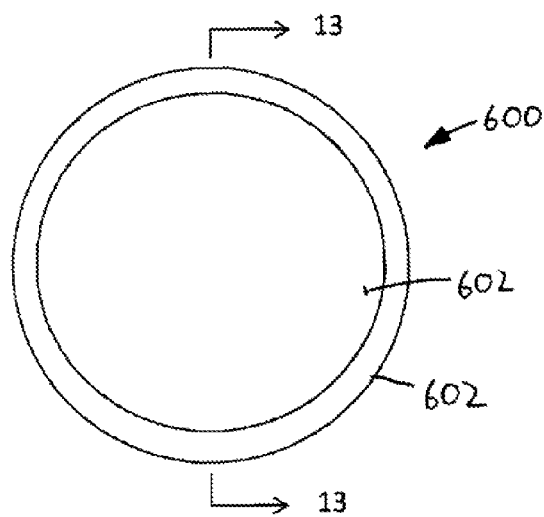
FIG. 12 is a drawing showing an exemplary packet.
Figure 13:
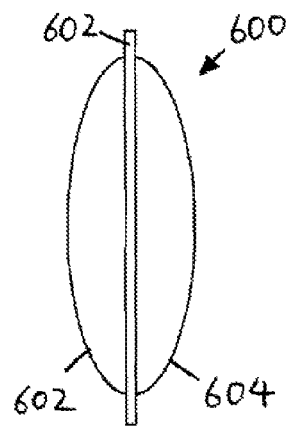
FIG. 13 is a drawing showing a side view of the packet shown in FIG. 12.

FIGS. 12 and 13 show front and side views, respectively, of a packet 600 according to an embodiment. The packet 600 includes two water-soluble films 602, 604 having a circular shape when viewed from the front (or the back), and connected together with a heat sealed circumferential edge 602. The packet 600 includes a mixture of materials discussed above. The packet 600 may also include a water-containing device, like those shown in FIGS. 4-9. The packet 600 is vacuumed prior to completing the heat sealing of the edge 602 of the packet 600.

Embodiments have been described herein. Those skilled in the art will appreciate that various modifications and substitutions are possible, without departing from the scope of the invention as claimed and disclosed, including the full scope of equivalents thereof.

What is claimed is:

1. A packet for growing vegetation, comprising:
    a surface film defining a sealed bag, wherein the surface film includes a water-soluble film, the water-soluble film being dissolvable upon contact with water, the surface film surrounding a dry mixture, wherein the dry mixture includes: soil, and seeds; and
    a water-containing device containing water, wherein the water-containing device is contained in the sealed bag, and the water-containing device includes a non-water-soluble film surface.

2. The packet according to claim 1, wherein the water-soluble film is polyvinyl alcohol (PVOH) film.

3. The packet according to claim 1, wherein the seeds are grass seeds, and the vegetation is grass.

4. The packet according to claim 1, wherein the water is liquid water.

5. The packet according to claim 1, further comprising a green colorant dye contained in the sealed bag.

6. The packet according to claim 1, wherein the dry mixture includes sand.

7. The packet according to claim 1, wherein the dry mixture includes mulch.

8. The packet according to claim 1, wherein the dry mixture includes a water jelly crystal.

9. A method for growing vegetation, comprising:
    providing a packet including water-soluble film containing a dry mixture, wherein the dry mixture includes soil and seeds, the packet further including a sealed bag of non-water-soluble film containing water;
    placing the packet on a ground;
    breaking the sealed bag to allow the water therein to contact the water-soluble film to dissolve at least some of the water-soluble film; and
    allowing the water to moisten the dry mixture to begin germination of the seeds.

10. The method according to claim 9, wherein the breaking step includes stepping on the packet by a user.

* * * * *